MAGNETIC CARD READER

Filed July 6, 1964

INVENTORS
ROBERT W. RYNO
BY GILBERT A. SCHWIBINGER
Andrus & Starke
Attorneys

Sept. 20, 1966 R. W. RYNO ET AL 3,274,352

MAGNETIC CARD READER

Filed July 6, 1964 4 Sheets-Sheet 2

INVENTORS
ROBERT W. RYNO
GILBERT A. SCHWIBINGER
BY Andrus & Starke
Attorneys

Sept. 20, 1966 R. W. RYNO ET AL 3,274,352

MAGNETIC CARD READER

Filed July 6, 1964 4 Sheets-Sheet 3

INVENTORS
ROBERT W. RYNO
BY GILBERT A. SCHWIBINGER

Andrus & Starke
Attorneys

INVENTORS.
ROBERT W. RYNO
BY GILBERT A. SCHWIBINGER
Andrus & Starke
Attorneys

United States Patent Office 3,274,352

Patented Sept. 20, 1966

3,274,352
MAGNETIC CARD READER

Robert W. Ryno and Gilbert A. Schwibinger, Milwaukee, Wis., assignors to A. O. Smith Corporation, Milwaukee, Wis., a corporation of New York Filed July 6, 1964, Ser. No. 380,347
11 Claims. (Cl. 200—46)

This invention relates to a magnetic card reader including a plurality of information bits in the form of magnetic control elements and particularly to such a magnetic card reader which forms a part of an explosion-proof enclosure.

In the development of coded control systems, punch card controls have been developed to a relatively high degree of sophistication. Generally, the code cards are provided with a plurality of intersecting columns and rows with the information bits selected or inserted in selected columns and rows to provide a coded input. Many highly developed code reading devices are available for receiving a card and actuating printers, recorders or other suitable devices which may form part of an automatic control or process system.

The present invention is particularly directed to a coded carrier employing magnetic control elements for actuating a plurality of switching means interconnected to provide a controlled output. The present invention in one important aspect is directed to such a system employing an explosion-proof enclosure of the switching means whereby it is peculiarly adapted for control or process systems in a normally explosive environment.

For example, in bulk distribution of gasoline and other fuels, unattended bulk loading stations or terminals have been suggested wherein a key controlled system is provided for driver operation. Each authorized carrier is provided with a keyed control at the bulk station, and its driver has a key for the corresponding key lock control. By inserting the key into the proper controls, the driver loads his truck and the amount of product withdrawn is automatically recorded in a control mechanism. Driver-attended terminals have many advantages both from the standpoint of security as well as utilization of the terminal and trucks.

However, fuel terminals are of necessity and inherently areas of highly explosive fumes and as a result, all controls must be such as to minimize and essentially eliminate any danger of explosion. However, to provide automatic control, the system must be adapted to economical operation as well as low initial costs and maintenance.

Particularly in accordance with the present invention, a magnetic card is provided preferably formed of a cast plastic or the like with a plurality of magnetic control members mounted within the plastic card. Preferably, magnetic bridging members which are small plate-like units are embedded in a coordinate array of intersecting columns and rows to provide a plurality of control locations some of which will include small plate-like flux diverting members. A card reader or decoder is provided including a plurality of similarly distributed magnetic fields located to couple and operate a similar array of switches. The flux diversion members will then control the flux field to selectively couple and decouple the fields with respect to the switches.

In accordance with a preferred construction where the magnetic card reader is to be employed in an explosive atmosphere, the card reader will be constructed in a pair of mating portions; for example, a top half and a lower half interconnected to form a card reader having a card slot intermediate between the two halves. Permanent magnets are disposed in one half and provided in a coordinated array and switches are correspondingly arrayed in the opposite half of the housing. The switch portion of the housing is constructed as an explosion-proof housing with the operation of the switches controlled by the insertion of the coded card into the housing. Thus, the code card would include magnetic shielding members; for example, such as to cause the magnetic field to be diverted through the flux diverting member and thus never extend into the switch half of the housing. As a result, only those switches at which no flux diversion member was provided would be actuated.

More particularly, in a preferred construction of the present invention, the magnetic field is established by a pair of small magnets which can be axially polarized to provide a pair of spaced pole members joined by a bridging member. In the switch half of the housing, a pair of pole pieces is aligned with the ceramic magnets and extend downwardly into adjacent relationship to opposite ends of a small reed switch. This has been found to provide a highly reliable, long life magnetic card reader wherein the magnetic card was formed of a metal sheet having a plurality of slots within which flux diverting metal inserts were disposed. The assembled plate and inserts were encased in a plastic material which could be readily located within the card reader.

The present invention thus provides a very rugged, reliable magnetic code system which is suitable for practical use by operators with minimum skills and with a minimum amount of care. One of the great advantages of the magnetic card reader in its preferred construction is the explosion-proof enclosure of all the switching mechanism such that it can be readily employed in a petroleum bulk loading terminal to provide driver attended terminals. The control card is constructed to essentially eliminate all of the effects of dirt, dust and other foreign matters as well as providing a durable reliable code card. Further, the code bit of the present invention can be hidden to prevent visual decoding without destruction of the card.

The drawings furnished herewith illustrate a preferred construction of the present invention and clearly illustrate all of the advantages heretofore discussed as well as certain other desirable features and advantages forming a part of the present invention.

Figures 1, 2, 3:
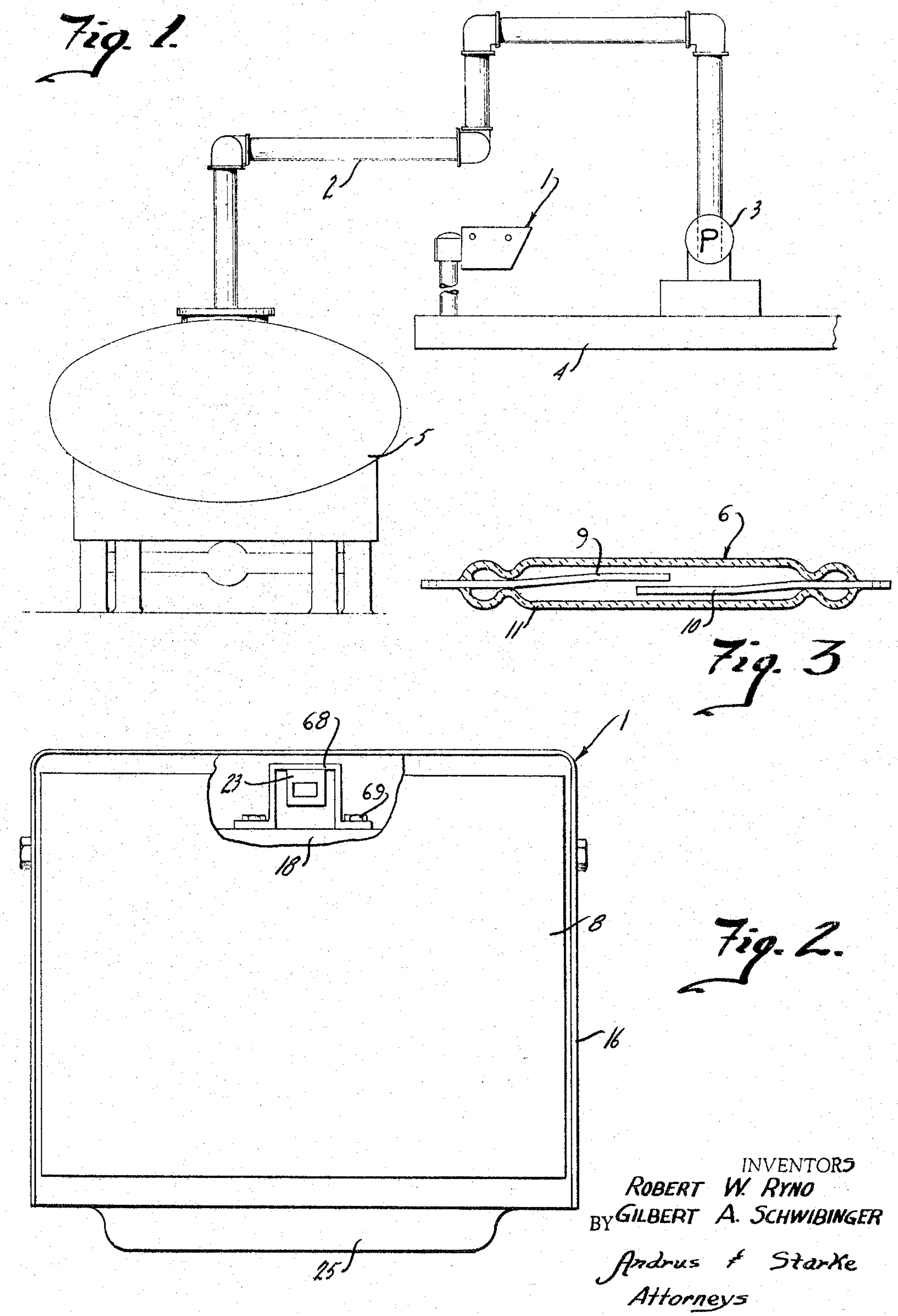
FIG. 1 is a diagrammatic partial illustration of a petroleum product bulk loading terminal having a code card reader constructed in accordance with the present invention.
FIG. 2 is an enlarged front elevational view of the card reader shown in FIG. 1.
FIG. 3 is an enlarged diagrammatic view of a reed switch shown in FIGS. 4–6.

Referring to the drawings and particularly to FIGS. 1 and 2, an explosion-proof magnetic code card reader 1 is exteriorly mounted and forms a part of a bulk loading terminal having a flow pipe 2 with an electrically controlled motor-pump unit 3. Card reader 1 is mounted on a raised platform 4, and a tank truck 5 or other suitable carrier is positioned to one side of the platform to receive a selected product. A control for the motor-pump unit 3 is actuated by the card reader 1 to provide for selective transfer of gasoline or other suitable petroleum product from corresponding storage tanks, not shown, which are connected to the inlet side of the flow pipe 2. The particular details of the motor-pump unit 3 and the interconnecting control are not of any particular significance in connection with the present invention and have, therefore, been shown diagrammatically and no further description thereof is given.

Generally, as shown in FIGS. 2–5, the code reader 1 includes a plurality of reed type control switches 6 mounted as a matrix within an enclosure 7 disposed within the lower portion of a housing having a pivotally mounted front door or cover 8.

Switches 6 are of any suitable magnetically responsive construction and one is diagrammatically shown in FIG. 3. Each switch 6 generally includes a pair of leaf-spring contacts 9 and 10 extending inwardly from opposite ends of a glass capsule 11. Switch 6 is normally open and is closed by a magnetic field longitudinally thereof, as hereinafter described.

The switches 6 are connected to actuate motor-pump unit 3 through an explosion-proof conduit seal 12 secured to the back wall of enclosure 7 as shown most clearly in FIG. 3. Conduit seal 12 is of any well-known construction having a conduit means through which the conductors pass and a fill means for introducing a suitable sealant.

A plurality of permanent magnet assemblies 13 form a part of an upper operating assembly 14 which is secured to the upper wall of the enclosure 7. The operating assembly 14 is spaced from the enclosure 7 in the area of the switches 6 to define a card receiving opening within which a generally rectangular code card 15 may be releasably inserted. As more fully developed hereinafter, the card 15 controls the interconnection of the permanent magnet assemblies 13 and the switches 6 to provide a coded actuation thereof such that only selected combinations of the switches 6 will operate the corresponding motor-pump unit 3. Consequently, only those individuals provided with a proper code card 15 can provide automatic unattended withdrawal of fluid from the storage tank.

Figure 4:
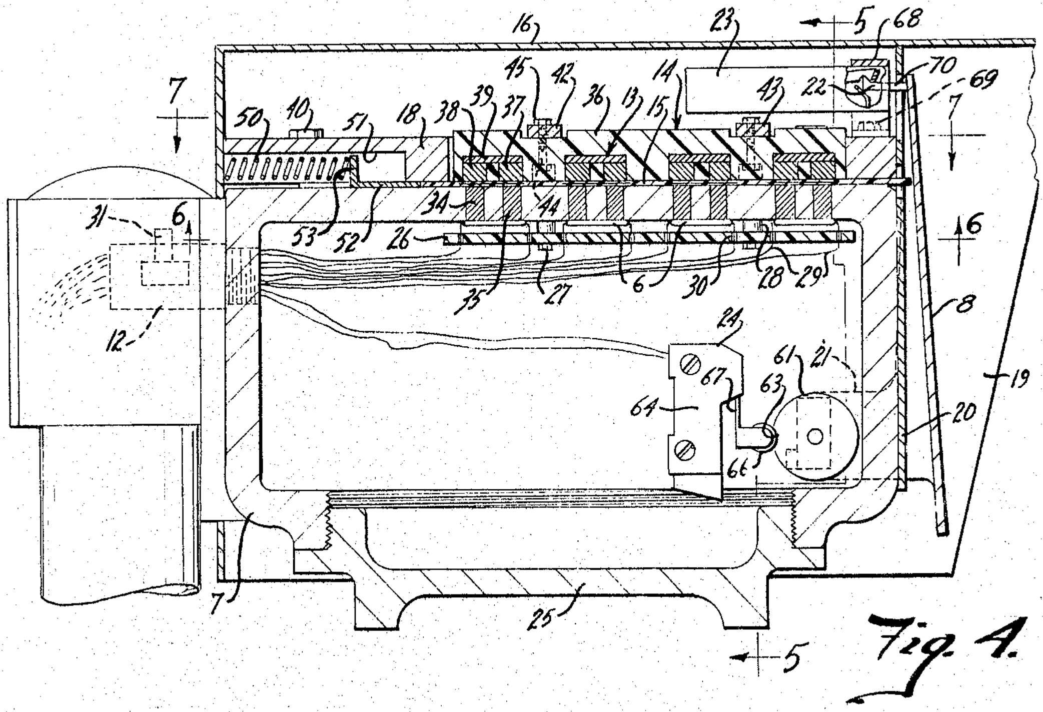
FIG. 4 is an enlarged vertical section through the card reader shown in FIGS. 1 and 2.
Figure 5:
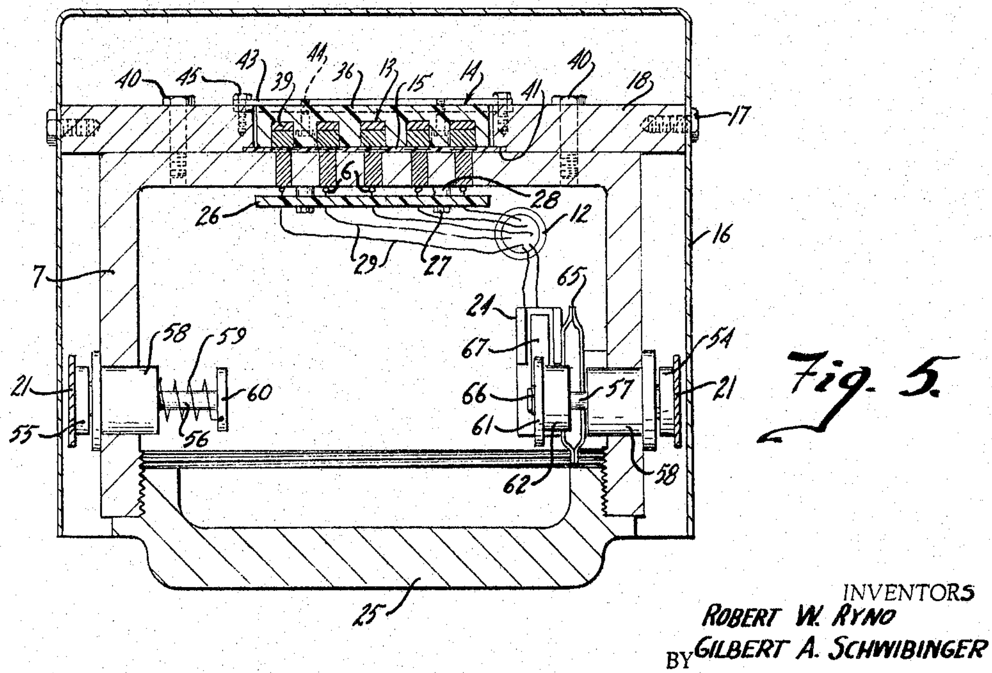
FIG. 5 is an enlarged vertical section taken on line 5—5 of FIG. 4.

More particularly, the card reader 1 includes a decorative sheet metal housing 16 interconnected or secured by suitable attachment screws 17 to a rectangular frame 18 of operating assembly 14, which as shown in FIG. 4, extends laterally to the opposite sides of the enclosure 7. The decorative housing 16 is generally an inverted box-like member and includes a hood 19 projecting outwardly of a front wall 20. The front cover 8 includes side bearing flanges 21 which extend through appropriate openings in wall 20 and are pivotally secured to the sides of enclosure 7. A releasable latch lever 22 interconnects the upper end of the front cover 8 to a latch unit 23 secured to the top wall of the assembly 14 and particularly frame 18. A cover actuated switch 24 is disposed within the explosion-proof enclosure 7 and interconnected with switches 6 such that the front cover 8 must be completely closed to properly locate a card 15 within the card reader 1 and actuate the control for motor-pump unit 3. For example, switches 6 may be connected in code tree circuits whereby selected combinations complete a circuit path therethrough to a control and switch 24 may be a normally open switch connected in series therewith to prevent completion of the circuit with cover 8 open.

The operation of the illustrated embodiment of the invention is briefly described as follows. The tank truck driver locates his truck 5 and connects the discharge end of the flow pipe 2 to the receiving tank. A code card 15 is inserted within the reader 1 and the cover 16 closed. Closing of the cover actuates the interlock switch 18 to permit coded actuation of unit 3. Assuming a valid card 15 having a customer code thereon has been placed in the card reader 1, the proper switches 6 are closed and actuates the motor-pump unit 3 to deliver gasoline or other stored material from the appropriate storage tank. In practice, other information, such as separate product release, customer identification and the like may be coded into card 15 within the limits of the particular coding system and particularly the code bits permitted by the card.

More particularly, in the illustrated embodiment of the invention, the explosion-proof enclosure is generally an inverted cup-shaped member of a relatively thick wall of aluminum or other suitable metal. A bottom wall member 25 is secured to the open bottom of the housing to completely enclose the switches 6 which are mounted immediately adjacent the upper wall portion by a switch mounting plate 26.

The switch mounting plate 16 is formed of a suitable insulating material or the like to permit direct mounting of the switches 6 thereon on the upper surface thereof. Attachment bolts 27 pass through suitable openings in the plate 26 and thread into tapped openings in the top wall of the enclosure. Suitable insulating spacers 28 encircle each of the attachment bolts 27 to properly space the mounting plate 26 and define a switch mounting space within which the switches 6 are disposed in engagement with the adjacent portion of the top wall of enclosure 7. The outer ends of the contacts 9 and 10 of each switch 6 are connected to suitable mounting and contact wires 29 which project downwardly and are sealed within suitable mounting openings 30 within the mounting plate 26. Wires 29 extend through and are sealed within plug connector 12 with the sealant, not shown, being introduced through a plug filling opening 31, shown in FIGS. 4 and 7.

The conduit seal 12 is of any suitable explosion-proof variety and no further description thereof is deemed necessary or is given.

Referring particularly to FIGS. 4–7, the switches 6 and the magnet assemblies 13 are shown arrayed in five similar columns 32 and four rows 33 to provide a twenty bit information coded arrangement. The switches 6 are shown with their axes aligned with each other in the respective columns 32 and laterally aligned in the four rows 33.

Each of the reed switches 6 is of a normally open construction with the leaf contacts 9 and 10 being resiliently constructed to provide or hold the overlapping ends in disengagement. The leaf contacts 9 and 10 are further formed of a suitable material such that alignment with a permanent magnet assembly 13, which is presently described, polarizes the contacts 9 and 10 and creates attraction therebetween to affect closing of the switches.

The outer ends of the individual contacts 9 and 10 are close coupled to the field of a corresponding magnetic unit 13 by a pair of similar pole pieces 34 and 35 which are press fitted or otherwise secured in vertical openings within the top wall of the enclosure 7. The magnetic fields of the magnet assemblies 13 are directed downwardly into coupling engagement with the switches 6.

Each of the illustrated magnet assemblies 13 is similarly constructed and supported in support plate 36 mounted in an appropriate opening in the frame 18.

Each of the magnet assemblies 8 includes a pair of cylindrical magnets 37 and 38 which are spaced and aligned in accordance with the pole pieces 33 and 34 in the lower housing. A pole piece 39 is secured spanning and engaging the back sides of magnets 37 and 38. The magnets 37 and 38 may be secured in place in any suitable manner as by being cast within a plate 36 of plastic such as an epoxy or other suitable material.

The magnets 37 and 38 are preferably small ceramic type magnets which permit polarization in the axial direction. In order to maintain highly reliable operation of the card reader 1, the magnet assemblies 13 are constructed with the magnets 37 and 38 polarized in the opposite direction and with the adjacent magnets of adjacent assemblies polarized in opposite directions as most clearly shown in FIG. 7, where the pole at the top end of each magnet is indicated by N for the north pole and S for the south pole.

The permanent magnet assemblies 8 are supported in proper relation by the support plate 36 which in turn is secured within a suitable correspondingly shaped opening in the frame 18. The frame 18 rests on the top of enclosure 7 and is secured thereto by a plurality of distributed attachment bolts 40 extending downwardly through the frame 18 and threading into suitably tapped openings in the top wall of the enclosure 7. The undersides of frame 18 is provided with a recessed portion 41 adjacent the plate 36 and the support plate 36 has its underside in the same plane as the recessed portion to define the card receiving slot for the card 15. This provides a minimum spacing between the magnet assemblies 13 and the pole pieces 34 and 35 while providing ample spacing to accept a relatively stable, self-supporting card 15.

A pair of mounting strips 42 and 43 are secured to the back side of the support plate 36 by small attachment screws or bolts 44 which project upwardly through suitable openings in the support plate 36 and thread into correspondingly tapped openings in the mounting strips 42 and 43. The mounting strips 42 and 43 span or extend beyond the side edges of the support plate 36 and rest directly on the back side of the frame 18. Suitable mounting and attachment bolts 45 extend downwardly through the end openings in the strips 42 and 43 and thread into suitably tapped openings in the back side of the frame 18 to properly support the magnet assemblies 13.

Figure 8:
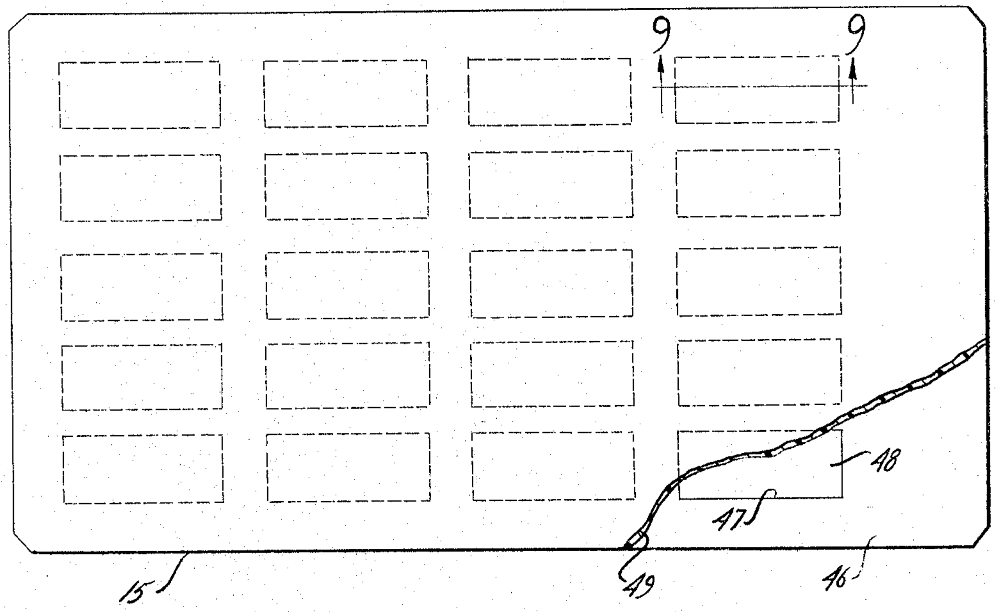
FIG. 8 is a plan view of the card shown in FIG. 7 in reduced scale.
Figure 9:
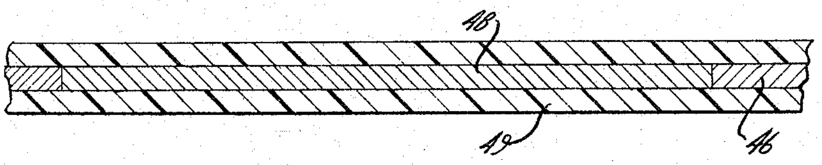
FIG. 9 is an enlarged vertical section through the magnetic card shown in FIGS. 3–6, inclusive.

Referring particularly to FIGS. 8 and 9, the code card 15 of the illustrated embodiment of the invention includes a metallic frame 46 of a suitable non-magnetic material such as aluminum. The metal frame 46 is provided with a plurality of slots or openings 47 arrayed in accordance with that of the switches 6 and/or the magnet assemblies 13. Thus, with the card 15 properly disposed within the card reader 1, each of the slots or openings 47 is aligned with the field created by a corresponding magnet assembly 13. The code system is provided by inserting within selected ones of the slots 47 magnetic inserts 48 of soft steel or the like function as a magnetic shielding or flux diverting member.

The non-magnetic frame 46 with the selected magnetic inserts 48 is then encapsulated within a suitable outer shell 49 of plastic or other suitable coating material which will also fill the openings 47 within which magnetic inserts have not been placed. The encapsulation of the card provides a smooth readily maintained rigid card. Additionally, the location of the inserts cannot be determined without destruction of the card and consequently the card cannot be readily decoded without destruction thereof. When a magnetic insert 48 is aligned with a magnet assembly 13, a shunt path is established for the magnetic field from poles 37 and 38 and diverts the magnetic flux from the corresponding switch 6. As a result, the switch 6 will open.

Figure 6:
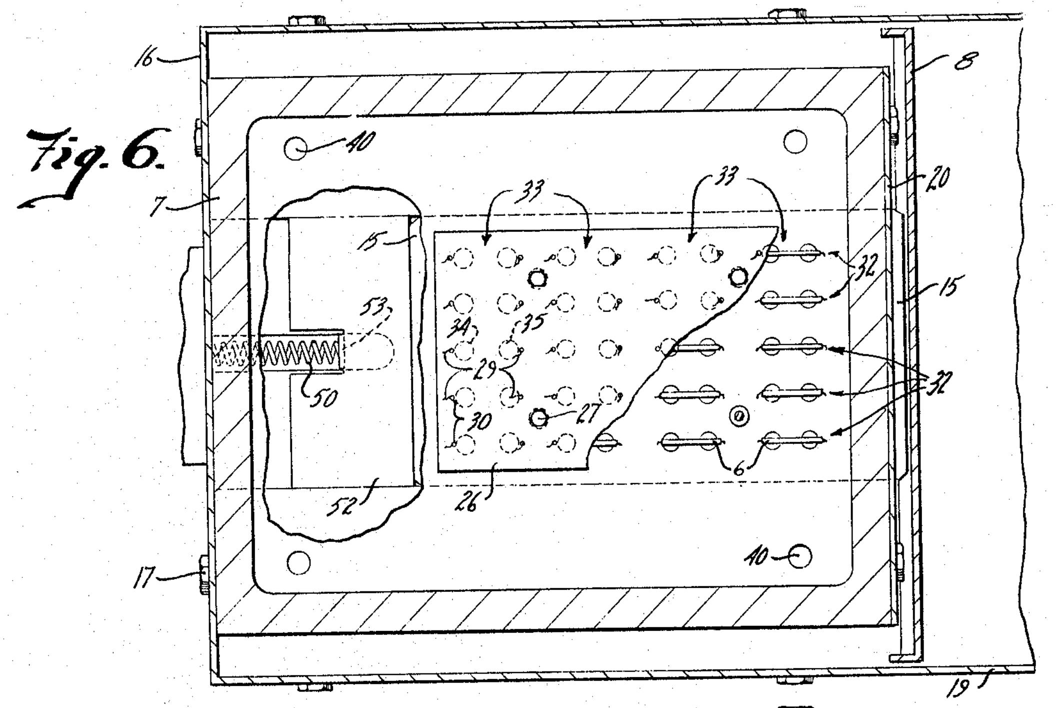
FIG. 6 is a horizontal section generally taken on line 6—6 of FIG. 4.
Figure 7:
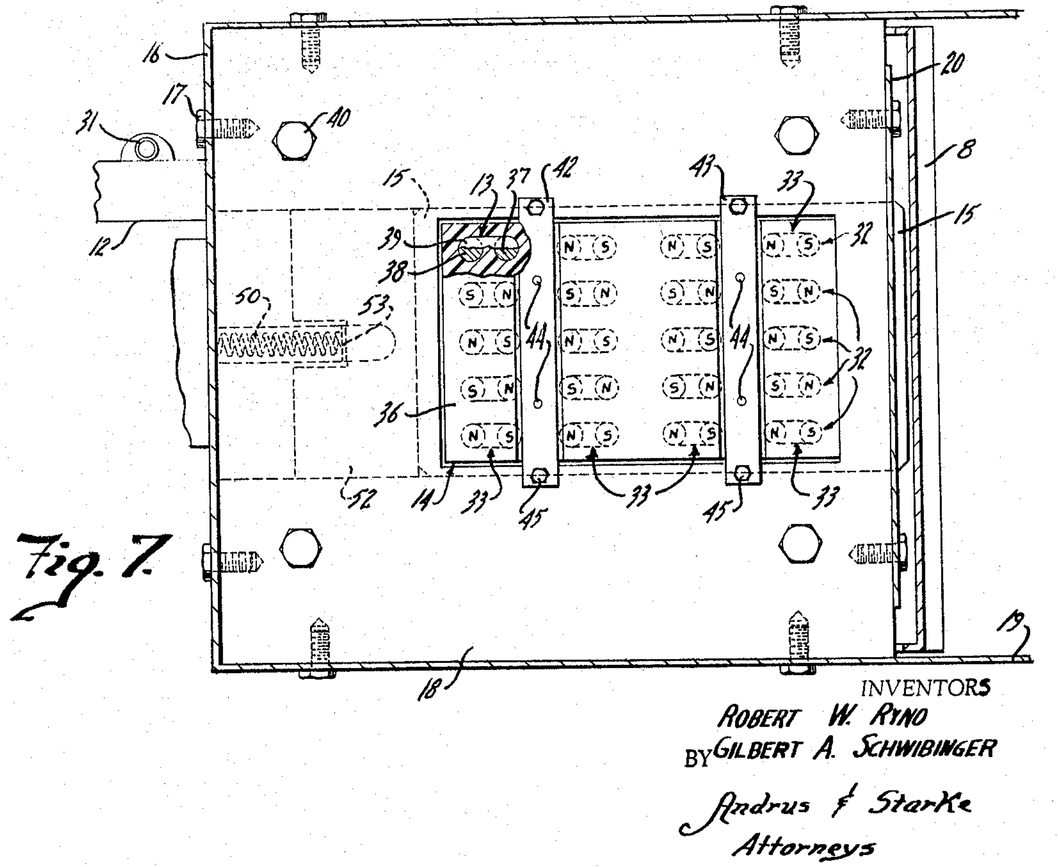
FIG. 7 is a horizontal section taken on line 7—7 of FIG. 4 with parts as broken away to show details of construction.

In the preferred construction, the card 15 must be held within the reader 1 by the interlocking door or front cover 8. A card position control spring 50 or other similar resilient means shown in FIGS. 4, 6 and 7, is disposed within a central recess 51 formed in the underside of the frame 18 and having a lower portion forming an extension of the card recess in the plate 36. A slide 52 of brass or other suitable similar material is slidably disposed within the recess 51 and includes an upstanding ear 53 engaged by the one end of the spring 50. The opposite end of the spring 50 acts against the back wall of the decorative housing 16. Spring 50 continuously urges the slider 52 forwardly with the forward portion of the slider disposed within the normal card position; i.e., tending to hold the card 15 only partially within the card reader and interfering with effective positioning of the card. As a result, the card 15 must be positively forced inwardly moving the slider 52 rearwardly and compressing the card control spring 50. Further, in accordance with the present invention, such holding action must be provided by closing of the front cover 8 in order to close the cover actuated switch 24.

Referring particularly to FIG. 4, the front door or cover 8 is generally a plate-like member having shallow side panels projecting inwardly adjacent the opposite sides of the housing 16. Bearing supports 54 and 55 are integrally connected with the side panels adjacent the lower portion of cover 8 and extend inwardly on opposite sides of the enclosure 7. Shafts 56 and 57 are similarly secured to the flanges 54 and 55 and rotatably supported in sealed bearings 58 which are secured within suitable openings in the side walls of the enclosure 7. Shafts 56 and 57 also include inner projections extending inwardly from the hubs 56, as shown most clearly in FIG. 5. A torsion spring 59 encircles the shaft 56, shown to the left in FIG. 5, and is secured at one end to the inner end of the bearing 58 and at the opposite end to a fixed disc 60 integrally formed or otherwise secured to the inner end of the shaft 56. The torsion spring 59 is stressed to bias the door 8 to the closed position but is not sufficiently strong to engage the latch assembly. The door 8 is, therefore, only partially closed by spring 59 and the operator must push inwardly on the door 8 to interengage the latch lever 22 and unit 23. This also stresses spring 59 such that when lever 22 disengages unit 23, the door 8 may open.

The torsion spring 59 is diagrammatically illustrated and may be replaced with any other suitable tension control. For example, a drum and cable may be secured to the shaft with a coil spring connecting the cable to the back wall of the closure such that opening of the cover winds the cable on the drum and increases the spring tension which will urge the cover closed.

A pair of switch actuating discs 61 is secured to the inner end of the opposite door shaft 57 by a suitable clamping hub 62 or the like. A recess or detent 63 is provided in the periphery of the switch actuator 61, as shown in FIG. 4. The door actuated switch 24 includes a switch body 64 mounted within the housing by a suitable frame 65 and an operating follower 66 secured to the end of a leaf spring 67 and biased thereby to engage the periphery of the switch actuating disc 61. With the door 8 in the closed position, the follower 66 is aligned with, and engages the recess or detent 63 to close the switch 24 and condition the control for operation if a proper code card 15 actuates switches 6. If the door is even partially open, the detent 63 moves out of alignment with the switch follower 66 which rides up on the larger radius of the actuator 61 and opens the switch to prevent operation of the control and consequently, energization of the motor-pump unit 3.

In the illustrated embodiment of the invention, the latching unit 23 is carried by a bracket 68 which in turn is secured to the frame 18, as by bolts 69. Lever 22 is secured to a mounting plate 70 which is bolted or otherwise secured to the top inner portion of cover 8 and extends through an opening in the front wall 20. Pushing inwardly on the top of cover 8 moves the lever 22 inwardly to alternately engage and disengage the latch unit 23 to close and open the front cover 8. Latch unit 23 is more fully shown and described in United States Patent 2,637,576, and as any suitable latch mechanism can be employed, no further description thereof is given. When the door is released, it can be opened by pushing inwardly on the lower edge thereof below the axis of the pivot shafts 56 and 57. This prevents creating of abnormal forces on the cover 8 which would distort or otherwise destroy its effectiveness in connection with the positioning of the card 15. Thus, although a conventional knob and latch unit might be provided on the upper portion of the cover, an operator may erroneously exert an excessive outward force on the cover 8 without unlatching the mechanism and thus destroy or otherwise damage the cover.

When it is desired to close the door 8, it is pushed inwardly and the latch lever 22 automatically moves into latching engagement with the latch unit 23.

The operation of the illustrated embodiment of the invention is briefly summarized as follows.

When a truck driver wishes to obtain fuel from a terminal, the tank truck 5 is properly located with respect to the discharge end of the flow pipe 2. A code card 15 is inserted in the card reader 1 by opening of the front door 8. This is accomplished by releasing the latch mechanism and pushing inwardly on the lower edge of the door to expose the card slot. The card 15 is placed within the slot until it engages the slides 52. The cover 8 is then released and forces the card 15 inwardly against the force of spring 50 on the slider 52. To properly locate the card 15, the operator will have to push inwardly on the cover 8 to provide interengagement of the latch lever 22 with bar 23. The cover actuated switch 24 will simultaneously be closed to permit operation of the control system.

When the card is properly located within the card reader 1, the flux diverting inserts 48 are aligned with the magnet assemblies 13 and switches 6. The inserts 48 provide low reluctance paths for the magnetic flux between magnets 37 and 38 and divert the flux from the aligned pole pieces 34 and 35 in the lower explosion-proof enclosure 7. As a result, the magnetic field normally impressed on the reed switches 6 is removed and the corresponding switches move to the normally open position.

Assuming the customer's code card 15 carries a permissive code, the proper switches 6 will be actuated to complete a circuit of a control and in turn operate, or permit operation of, the motor-pump unit 3. Thus, a final release switch or the like could also be provided or a separate nozzle might be provided to prevent discharge of fuel without proper positioning of the discharge pipe 2. To discontinue delivery, it is merely necessary to push the lower edge of cover 8 and thereby open the cover interlock switch 24. The operator can then remove the card 15 and positively close the cover 8 or the torsion spring 59 will move the cover to a partially closed position beneath the hood 19.

The explosion-proof construction of the assembly permits mounting of the card reader 1 as a part of the loading station and consequently provides a very substantial advantage in connection with driver attendant fueling stations and the like.

The plastic encapsulated code card 15 not only provides a very rigid long-life unit but prevents visual reading of the coding of the card. The smooth uninterrupted outer surface also provides a very convenient surface upon which to provide the instructions for operation of the system.

Although small ceramic type magnets are shown providing the necessary operating field, any other suitable system for generating a magnetic field may be employed.

Various modes of carrying out the invention are contemplated as being within the scope of the following claims particularly pointing out and distinctly claiming the subject matter which is regarded as the invention.

We claim:

1. A control apparatus responsive to a code means carrying flux controlling means comprising, a plurality of flux responsive switch means arranged in a predetermined space pattern and having terminal means for connection in a code circuit, field means establishing an operating flux field associated with the several switch means and operable to actuate the same, support means supporting an inserted code means in the field means to provide actuation of the switch means in accordance with the pattern of the flux controlling means, resilient means in the support means resiliently interfering with positioning of the code means, and control means responsive to selected positioning of a code means in the support to provide a conjoint control action with the switch means whereby said code means has a preselected effective position.

2. The control apparatus of claim 1 wherein, said control means is a control card and the support includes a card slot having a resiliently biased slider mounted within the card slot, and a door means pivotally secured to the support and releasably locked overlying the entrance to said slot holding the control card in an effective position.

3. A control apparatus comprising, a two-part housing, one part of which is explosion proof and spaced from the opposite part, a plurality of flux responsive switch means arranged in a predetermind spaced pattern within the first part of the housing, field means disposed in the opposite part and establishing operating flux fields associated one each with each switch means and operable to actuate the same, a code means carrying flux controlling means for the several switch means, and means mounting the code means between said two parts to actuate the switch means in accordance with the pattern of the flux controlling means.

4. An explosion-proof coded system, comprising, a switch enclosure having a plurality of switches mounted adjacent a first wall in a predetermined array, a magnetic actuator secured adjacent the first wall of the enclosure and having a plurality of permanent magnets in a similar array and aligned with the switches, said actuator being spaced from the wall in the portion of the aligned switches to provide a card receiving space, and a code card having a plurality of magnetic inserts spaced in accordance with selected ones of the switches to divert the flux of the corresponding magnets from the switches.

5. The assembly of claim 4 wherein, the matrix of said switches and magnet assemblies includes mutually intersecting rows and columns with the switches and magnet assemblies similarly oriented, said switches are reed switches, and the magnet assemblies include oppositely polarized ceramic magnets aligned with the opposite ends of the reed switches and the immediate adjacent assemblies have the aligned ceramic magnets oppositely polarized.

6. An explosion-proof code assembly comprising, a switch enclosure having a plurality of reed switches mounted in a matrix to the underside of a top wall, a plurality of pole pieces secured within the top wall, a pole piece being aligned with each end of each switch, a magnetic actuator secured to the top wall of the enclosure and having a plurality of generally downwardly opening U-shaped magnet assemblies in a similar matrix having the ends aligned with the pole pieces, said actuator being spaced from the wall in the portion of the aligned switches to provide a card receiving space, and a code card having a plurality of magnetic inserts spaced in accordance with selected ones of the switches to divert the flux of the corresponding magnets from the switches.

7. The assembly of claim 6 wherein, each of said magnet assemblies includes a pair of oppositely polarized ceramic magnets connected by a bridging member to define the U-shaped.

8. The assembly of claim 7 wherein the adjacent ceramic magnets of adjacent assemblies are oppositely polarized.

9. An explosion-proof card controlled system comprising, an explosion-proof housing formed of a non-magnetic material, a plurality of magnetically responsive reed switches mounted immediately below the top wall of the housing in a preselected pattern, pairs of magnetic pole pieces one pair for each reed switch and forming a part of the top wall of the housing, said pole pieces being aligned with opposite ends of the corresponding reed switch, a frame plate bolted to the top wall and having an opening aligned with said switches and partially spaced from the top wall to define a card receiving slot, a permanent magnet support plate secured within said opening, a plurality of U-shaped magnets supported within the support plate in alignment with corresponding pole pieces, a card position control means disposed within the card slot and resiliently mounted in the proper position of the card, a latch means to hold the card in proper position against the action of the position control means, and a switch means actuated by the latch means.

10. An explosion-proof card controlled system comprising, an explosion-proof housing formed of a non-magnetic material, a plurality of magnetically responsive reed switches mounted immediately below the top wall of the housing and arranged in rows and columns, pairs of spaced magnetic pole pieces forming a part of the top wall of the housing, at least one pair for each reed switch and each pair spaced to align with the opposite ends of the corresponding reed switch, a top frame plate bolted to the top wall and having an opening aligned with said switches and having a recess on the underside defining with said top wall a card receiving slot, a permanent magnet support plate secured within said opening with its lower face coplanar with the face of the recess, a plurality of pairs of cylindrical ceramic magnets supported within the support plate and aligned one each with each of said pole pieces, the lower face of the ceramic magnets lying in the face of the support plate and the magnets in each pair being oppositely axially polarized and each magnet being oppositely polarized with respect to the adjacent magnets of adjacent pairs, a plurality of magnetic pole pieces one for each pair of ceramic magnets connecting the back sides of each pair of ceramic magnets, a card slide slidably disposed within the card slot and urged outwardly to hold the card from alignment with the switch array, an outer enclosure secured to the top frame plate, a front cover pivotally mounted overlying the card slot and having a depending pivot portion below the pivot axis, a spring urging the cover substantially closed, a switch means actuated by complete closing of the cover, and a releasable latch unit having a latch member secured within the enclosure and a latch member secured to the cover for holding of the cover closed, the latch member secured to the cover being secured thereto by a spring plate to permit pivotal movement thereof.

11. A control apparatus responsive to one of a plurality of code cards each of which carries a plurality of flux controlling means arranged in different patterns within a general pattern comprising, a plurality of magnetically actuated switches arranged in a predetermined spaced planar pattern corresponding to said general pattern and having terminal means for connection in a code circuit, a plurality of magnets mounted in a spaced aligned generally parallel plane with respect to said plane of the switches and in the same general pattern with a predetermined constant gap therebetween, said magnets establishing individual operating flux fields coupled one each to each of the several switches and operable to actuate the same, and support means for supporting any one of said code cards within the gap between the switches and the magnets and establishing actuation of the switches in accordance with the pattern of the flux controlling means whereby only certain selected switches are actuated by each code card to provide a related coded output.

References Cited by the Examiner

UNITED STATES PATENTS

| | | | |
|---|---|---|---|
| 3,154,761 | 10/1964 | O'Gorman | 200—87 X |
| 3,210,498 | 10/1965 | Jackson et al. | 200—87 |
| 3,211,267 | 10/1965 | Bayha | 200—87 X |

BERNARD A. GILHEANY, *Primary Examiner.*

T. D. MACBLAIN, *Assistant Examiner.*